US012194698B2

(12) United States Patent
Breitkopf et al.

(10) Patent No.: US 12,194,698 B2
(45) Date of Patent: Jan. 14, 2025

(54) METHOD FOR MAKING EMBEDDED HYDROGEL CONTACT LENSES

(71) Applicant: Alcon Inc., Fribourg (CH)

(72) Inventors: Richard Charles Breitkopf, Dunwoody, GA (US); Zahra Bassampour, Alpharetta, GA (US); Chandana Kolluru, Suwanee, GA (US); Steve Yun Zhang, Sugar Hill, GA (US)

(73) Assignee: Alcon Inc., Fribourg (CH)

( * ) Notice: Subject to any disclaimer, the term of this patent is extended or adjusted under 35 U.S.C. 154(b) by 496 days.

(21) Appl. No.: 17/701,819

(22) Filed: Mar. 23, 2022

(65) Prior Publication Data

US 2022/0305747 A1 Sep. 29, 2022

Related U.S. Application Data

(60) Provisional application No. 63/165,292, filed on Mar. 24, 2021.

(51) Int. Cl.
*G02C 7/00* (2006.01)
*B29C 45/14* (2006.01)
(Continued)

(52) U.S. Cl.
CPC .... *B29D 11/0048* (2013.01); *B29C 45/14065* (2013.01); *B29D 11/00038* (2013.01); *B29D 11/00048* (2013.01); *B29D 11/00134* (2013.01); *B29D 11/00221* (2013.01); *B29D 11/00346* (2013.01); *C08J 3/075* (2013.01); *C08J 3/24* (2013.01); *G02C 7/049* (2013.01);
(Continued)

(58) Field of Classification Search
CPC .......... B29C 33/3842; B29C 45/14065; B29D 11/0048; B29D 11/00038; B29D 11/00048; B29D 11/00134; B29D 11/00221; B29D 11/00346; B29D 11/00067; B29D 11/00807; B29K 2083/00; B29K 2633/08; B29K 2715/00; C08J 3/075; C08J 3/24; C08J 2383/04; G02C 7/049
USPC ...................................... 351/159.02–159.38
See application file for complete search history.

(56) References Cited

U.S. PATENT DOCUMENTS 3,536,386 A   10/1970  Spivack
3,679,504 A    7/1972  Wichterle
(Continued)

FOREIGN PATENT DOCUMENTS

CN   107669400 A   2/2018
EP     0312049 A2   4/1989
(Continued)

OTHER PUBLICATIONS

K. J. Sax, et al. "Preparation and Infrared Absorption Spectra of Some Phenyl Ethers", J. Org. Chem., 1960, vol. 25(9), pp. 1590-1595.

*Primary Examiner* — Mahidere S Sahle
(74) *Attorney, Agent, or Firm* — Jian Zhou

(57) ABSTRACT

The invention relates to a method for producing embedded hydrogel contact lenses each having a magnetized insert that comprises magnetic particles and is centrally embedded in the bulk hydrogel material of the embedded hydrogel contact lens. During molding, a magnetized insert can be centered and held in position in a lens mold by using a magnet placed below the lens mold. The invention also relates to an embedded hydrogel contact lens produced from a method of the invention.

19 Claims, 1 Drawing Sheet

A

B

(51) Int. Cl.
*B29D 11/00* (2006.01)
*C08J 3/075* (2006.01)
*C08J 3/24* (2006.01)
*G02C 7/02* (2006.01)
*G02C 7/04* (2006.01)
*B29C 33/38* (2006.01)
*B29K 83/00* (2006.01)
*B29K 633/04* (2006.01)

(52) U.S. Cl.
CPC .... *B29C 33/3842* (2013.01); *B29D 11/00067* (2013.01); *B29D 11/00807* (2013.01); *B29K 2083/00* (2013.01); *B29K 2633/08* (2013.01); *B29K 2715/00* (2013.01); *C08J 2383/04* (2013.01)

(56) References Cited

U.S. PATENT DOCUMENTS

| | | |
|---|---|---|
| 3,712,718 A | 1/1973 | LeGrand |
| 3,926,659 A | 12/1975 | Bernhard et al. |
| 4,136,250 A | 1/1979 | Mueller et al. |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,268,132 A | 5/1981 | Neefe |
| 4,276,402 A | 6/1981 | Chromecek et al. |
| 1,327,203 A | 4/1982 | Deichert et al. |
| 4,341,889 A | 7/1982 | Deichert et al. |
| 4,343,927 A | 8/1982 | Chang |
| 4,355,147 A | 10/1982 | Deichert et al. |
| 4,401,371 A | 8/1983 | Neefe |
| 4,444,711 A | 4/1984 | Schad |
| 4,460,523 A | 7/1984 | Neefe |
| 4,460,534 A | 7/1984 | Boehm et al. |
| 4,486,577 A | 12/1984 | Mueller |
| 4,543,398 A | 9/1985 | Bany |
| 4,582,402 A | 4/1986 | Knapp |
| 4,605,712 A | 8/1986 | Mueller |
| 4,634,449 A | 1/1987 | Jenkins |
| 4,661,575 A | 4/1987 | Tom |
| 4,684,538 A | 8/1987 | Klemarczyk |
| 4,703,097 A | 10/1987 | Wingler |
| 4,704,017 A | 11/1987 | Knapp |
| 4,719,657 A | 1/1988 | Bawa |
| 4,744,647 A | 5/1988 | Meshel |
| 4,833,218 A | 5/1989 | Lee |
| 4,837,289 A | 6/1989 | Mueller |
| 4,929,693 A | 5/1990 | Akashi et al. |
| 4,954,586 A | 9/1990 | Nobuyuki et al. |
| 4,954,587 A | 9/1990 | Mueller |
| 5,010,141 A | 4/1991 | Mueller |
| 5,034,166 A | 7/1991 | Rawlings et al. |
| 5,034,461 A | 7/1991 | Lai et al. |
| 5,039,761 A | 8/1991 | Ono |
| 5,070,170 A | 12/1991 | Robertson |
| 5,070,215 A | 12/1991 | Bambury et al. |
| 5,079,319 A | 1/1992 | Mueller |
| 5,098,546 A | 3/1992 | Kawashima et al. |
| 5,120,121 A | 6/1992 | Rawlings |
| 5,156,726 A | 10/1992 | Nakada et al. |
| 5,166,345 A | 11/1992 | Akashi et al. |
| 5,346,946 A | 9/1994 | Yokoyama et al. |
| 5,358,995 A | 10/1994 | Lai |
| 5,387,632 A | 2/1995 | Lai |
| 5,414,477 A | 5/1995 | Jahnke |
| 5,416,132 A | 5/1995 | Yokoyama et al. |
| 5,449,729 A | 9/1995 | Lai |
| 5,451,617 A | 9/1995 | Lai |
| 5,486,579 A | 1/1996 | Lai et al. |
| 5,527,925 A | 6/1996 | Chabrecek et al. |
| 5,583,163 A | 12/1996 | Müller |
| 5,665,840 A | 9/1997 | Pöhlmann et al. |
| 5,712,356 A | 1/1998 | Bothe et al. |
| 5,760,100 A | 6/1998 | Nicolson et al. |
| 5,793,466 A | 8/1998 | Moncada |
| 5,843,346 A | 12/1998 | Morrill |
| 5,849,841 A | 12/1998 | Mühlebach et al. |
| 5,894,002 A | 4/1999 | Boneberger et al. |
| 5,962,548 A | 10/1999 | Vanderlaan |
| 5,981,675 A | 11/1999 | Valiant, Jr. |
| 6,017,121 A | 1/2000 | Chateau et al. |
| 6,019,914 A | 2/2000 | Lokshin et al. |
| 6,039,913 A | 3/2000 | Hirt |
| 6,113,814 A | 9/2000 | Gemert et al. |
| 6,149,841 A | 11/2000 | Kumar |
| 6,165,408 A | 12/2000 | Steinmann |
| 6,166,236 A | 12/2000 | Bambury |
| 6,221,303 B1 | 4/2001 | Steinmann |
| 6,296,785 B1 | 10/2001 | Nelson et al. |
| 6,302,952 B1 | 10/2001 | Mobbs et al. |
| 6,303,687 B1 | 10/2001 | Müller |
| 6,348,604 B1 | 2/2002 | Nelson et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,762,264 B2 | 7/2004 | Kunzler |
| 6,851,805 B2 | 2/2005 | Blum et al. |
| 6,867,245 B2 | 3/2005 | Iwata et al. |
| 6,995,192 B2 | 2/2006 | Phelan et al. |
| 7,214,809 B2 | 5/2007 | Zanini |
| 7,278,736 B2 | 10/2007 | Ocampo et al. |
| 7,423,074 B2 | 9/2008 | Lai |
| 7,490,936 B2 | 2/2009 | Blum et al. |
| 7,556,750 B2 | 7/2009 | Xiao et al. |
| 7,584,630 B2 | 9/2009 | Van Gemert |
| 7,605,190 B2 | 10/2009 | Moszner et al. |
| 7,883,207 B2 | 2/2011 | Iyer |
| 7,931,832 B2 | 4/2011 | Pugh et al. |
| 7,977,430 B2 | 7/2011 | Devlin et al. |
| 7,999,989 B2 | 8/2011 | Asai et al. |
| 8,154,804 B2 | 4/2012 | McGinn et al. |
| 8,158,037 B2 | 4/2012 | Chopra et al. |
| 8,215,770 B2 | 7/2012 | Blum et al. |
| 8,348,424 B2 | 1/2013 | Pugh et al. |
| 8,415,405 B2 | 4/2013 | Maggio |
| 8,475,529 B2 | 7/2013 | Clarke |
| 8,480,227 B2 | 7/2013 | Qiu et al. |
| 8,529,057 B2 | 9/2013 | Qiu |
| 8,614,261 B2 | 12/2013 | Iwata |
| 8,658,748 B2 | 2/2014 | Liu et al. |
| 8,697,770 B2 | 4/2014 | Duis et al. |
| 8,741,188 B2 | 6/2014 | Chopra et al. |
| 8,770,747 B2 | 7/2014 | Corti et al. |
| 8,835,525 B2 | 9/2014 | Kuyu et al. |
| 8,874,182 B2 | 10/2014 | Etzkorn et al. |
| 8,922,898 B2 | 12/2014 | Legerton et al. |
| 8,993,651 B2 | 3/2015 | Chang |
| 9,039,173 B2 | 5/2015 | Tucker et al. |
| 9,052,438 B2 | 6/2015 | Xiao et al. |
| 9,097,840 B2 | 8/2015 | Chang et al. |
| 9,097,916 B2 | 8/2015 | Chopra et al. |
| 9,103,965 B2 | 8/2015 | Chang |
| 9,155,614 B2 | 10/2015 | Blum et al. |
| 9,176,332 B1 | 11/2015 | Etzkorn et al. |
| 9,217,813 B2 | 12/2015 | Liu et al. |
| 9,296,158 B2 | 3/2016 | Pugh et al. |
| 9,465,234 B2 | 10/2016 | Chopra et al. |
| 9,475,827 B2 | 10/2016 | Chang et al. |
| 9,618,773 B2 | 4/2017 | Clarke |
| 9,731,437 B2 | 8/2017 | Pugh et al. |
| 9,846,263 B2 | 12/2017 | Breitkopf et al. |
| 9,889,615 B2 | 2/2018 | Pugh et al. |
| 9,904,074 B2 | 2/2018 | Duis et al. |
| 9,977,260 B2 | 5/2018 | Pugh et al. |
| 10,025,118 B1 | 7/2018 | Markus et al. |
| 10,064,977 B2 | 9/2018 | Jiang et al. |
| 10,081,697 B2 | 9/2018 | Huang et al. |
| 10,156,736 B2 | 12/2018 | Day |
| 10,197,707 B2 | 2/2019 | Xiao et al. |

(56) References Cited

U.S. PATENT DOCUMENTS

| | | |
|---|---|---|
| 10,203,521 B2 | 2/2019 | Pugh et al. |
| 10,209,534 B2 | 2/2019 | Alli et al. |
| 10,253,191 B2 | 4/2019 | Shimizu et al. |
| 10,301,451 B2 | 5/2019 | Jing et al. |
| 10,465,047 B2 | 11/2019 | Jing et al. |
| 2001/0050753 A1 | 12/2001 | Tucker |
| 2003/0184710 A1 | 2/2003 | Tucker |
| 2003/0085934 A1 | 5/2003 | Tucker |
| 2003/0119943 A1 | 6/2003 | Tucker et al. |
| 2004/0038355 A1 | 2/2004 | Vogt et al. |
| 2004/0141150 A1 | 7/2004 | Roffman et al. |
| 2007/0032573 A1 | 2/2007 | Yanagase et al. |
| 2009/0091818 A1 | 4/2009 | Haddock et al. |
| 2009/0255442 A1 | 10/2009 | Hollman et al. |
| 2010/0076553 A1 | 3/2010 | Pugh et al. |
| 2011/0157544 A1 | 6/2011 | Pugh et al. |
| 2012/0140167 A1 | 6/2012 | Blum |
| 2015/0305929 A1 | 10/2015 | Goldberg et al. |
| 2017/0183520 A1 | 6/2017 | Breitkopf et al. |
| 2020/0376787 A1 | 12/2020 | Zhang et al. |

FOREIGN PATENT DOCUMENTS

| | | |
|---|---|---|
| EP | 0632329 A1 | 1/1995 |
| JP | H071418 U | 1/1995 |
| JP | 4976254 B2 | 7/2012 |
| WO | 2019176952 A1 | 9/2019 |

A B
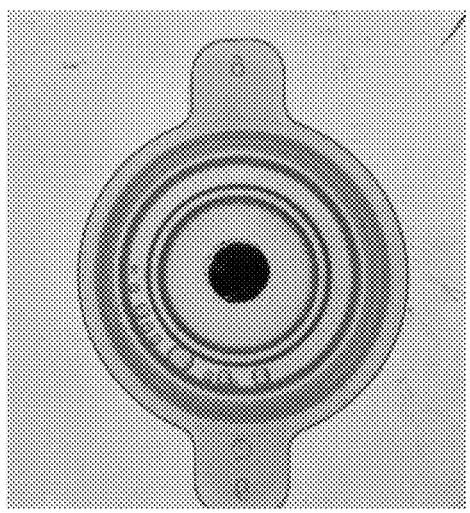 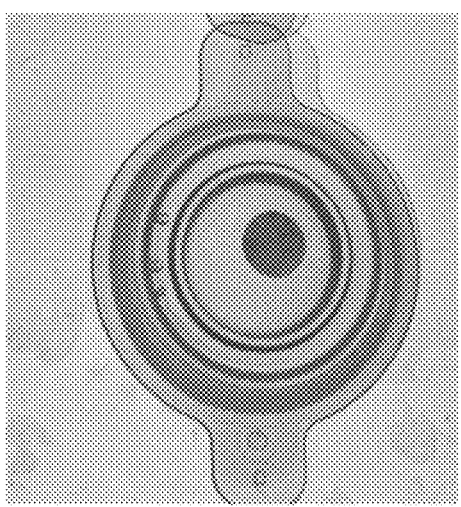

METHOD FOR MAKING EMBEDDED HYDROGEL CONTACT LENSES

This application claims the benefit under 35 USC § 119 (e) of U.S. provisional application No. 63/165,292 filed on 24 Mar. 2021, incorporated by references in its entirety.

The present invention generally relates to a method for producing embedded hydrogel contact lenses. In addition, the present invention provides embedded hydrogel contact lenses produced according to a method of the invention.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in lens molds), demolding (i.e., removing lenses from molds), extracting lenses with an extraction medium, hydrating lenses, packaging and sterilizing the hydrated lenses. During the lens hydration, the hydrogel contact lenses will absorb water and typically can swell significantly in size.

In recent years, it has been proposed that various inserts can be incorporated in hydrogel contact lenses for various purposes, e.g., for corneal health, vision correction, diagnosis, etc. See, for example, U.S. Pat. Nos. 4,268,132, 4,401,371, 5,098,546, 5,156,726, 6,851,805, 7,104,648, 7,490,936, 7,883,207, 7,931,832, 8,154,804, 8,215,770, 8,348,424, 8,874,182, 8,922,898, 9,155,614, 9,176,332, 9,296,158, 9,618,773, 9,731,437, 9,889,615, 9,977,260, 10,203,521, and 10,209,534; and U.S. Pat. Appl. Pub. Nos. 2004/0141150, 2009/0091818, 2010/0076553, 2011/0157544, and 2012/0140167).

An insert typically needs to be placed and fixed precisely in a specifically designed position in an embedded hydrogel contact lens. It is a great challenge to produce embedded hydrogel contact lenses that comprise one or more inserts embedded in specific positions in the embedded hydrogel contact lenses. A typical approach is to use molds having positioning guides (posts) provided on their molding surface for cast-molding embedded hydrogel contact lenses. Those positioning guides (posts) provides means for precisely positioning inserts in molds during cast-molding process. However, by using such molds with positioning guides (posts), small holes derived from those positioning guides (posts) are formed in resultant embedded hydrogel contact lenses. Those small holes in the embedded hydrogel lenses are susceptible to bioburden trapping.

Therefore, there is still a need for producing embedded hydrogel contact lenses (preferably embedded silicone hydrogel contact lenses) having inserts positioned accurately therein in a relatively efficient and consistent manner and which can be readily implemented in a production environment.

SUMMARY OF THE INVENTION

In some aspects, the invention provides a method for producing embedded hydrogel contact lenses, the method of invention comprising the steps of: (1) obtaining a magnetized insert which comprises a front surface, an opposite back surface and a diameter up to about 13.0 mm, wherein the insert is made of a polymeric material and comprises magnetic particles; (2) obtaining a lens mold, wherein the lens mold comprises a female mold half having a first molding surface and a male mold half having a second molding surface, wherein the female and male mold halves are configured to receive each other such that a mold cavity is formed between the first and second molding surfaces when the mold is closed; (3) in no particular order, placing the magnetized insert in the lens mold and introducing a lens-forming composition in the lens mold, wherein the magnetized insert is immersed in the lens-forming composition in the lens mold and centered in the lens mold by using a magnet which is place below the lens mold; (4) curing the lens-forming composition in the lens mold while holding the magnetized insert centered in the lens mold by the magnet to form an unprocessed embedded hydrogel contact lens that comprise a bulk hydrogel material formed from the lens-forming composition and the magnetized insert embedded in the bulk hydrogel material and centered in the unprocessed embedded hydrogel contact lens; (5) separating the lens mold obtained in step (4) into the male and female mold halves, with the unprocessed embedded hydrogel contact lens adhered on a lens-adhered mold half which is one of the male and female mold halves; (6) removing the unprocessed embedded hydrogel contact lens from the lens-adhered mold half (preferably before the unprocessed embedded hydrogel contact lens is contact with water or any liquid); and (7) subjecting the unprocessed embedded hydrogel contact lens to post-molding processes including a hydration process and one or more other processes selected from the group consisting of extraction, surface treatment, packaging, sterilization, and combinations thereof.

In other aspects, the invention provides an embedded hydrogel contact lens, comprising: an anterior surface, an opposite posterior surface, a bulk hydrogel material, and a magnetized insert embedded in the bulk hydrogel material, wherein the magnetized insert is made of a polymeric material and comprises magnetic particles, wherein the magnetized insert has a front surface, an opposite back surface and a diameter up to about 13.0 mm, wherein the magnetized insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

BRIEF DESCRIPTION OF DRAWINGS

FIG. 1 shows images of the unprocessed embedded SiHy contact lens obtained before opening the mold: 1A—comprising a magnetized insert that is centered and formed from an insert-forming composition including 1% by weight of magnetite; 1B (Control)—comprising a non-magnetized insert that is decentered and formed from an insert-forming composition free of any magnetite.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a cross-linked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" or "non-silicone hydrogel material" interchangeably refers to a hydrogel that is theoretically free of silicon.

A "male mold half" or "base curve mold half" interchangeably refers to a mold half having a molding surface that is a substantially convex surface and that defines the posterior (back) surface of a contact lens (or an insert).

A "female mold half" or "front curve mold half" interchangeably refers to a mold half having a molding surface that is a substantially concave surface and that defines the anterior (front) surface of a contact lens (or an insert).

The term "anterior surface", "front surface", "front curve surface" or "FC surface" in reference to a contact lens or an insert, as used in this application, interchangeably means a surface of the contact lens or insert that faces away from the eye during wear. The anterior surface (front surface) is typically substantially convex.

The "posterior surface", "back surface", "base curve surface" or "BC surface" in reference to a contact lens or insert, as used in this application, interchangeably means a surface of the contact lens or insert that faces towards the eye during wear. The posterior surface (back surface) is typically substantially concave.

An "embedded hydrogel contact lens" refers a hydrogel contact lens comprising at least one insert which is embedded fully or partially within the bulk hydrogel material of the embedded hydrogel contact lens.

In this application, an "insert" refers to any preformed article which has a diameter of up to 13 mm, a front (anterior) surface, an opposite back (posterior) surface, and a thickness less than any thickness of an embedded hydrogel contact lens in the region where the insert is embedded. It is understood that the insert must be smaller than the embedded hydrogel contact lens in dimension, so as to be embedded in the bulk material of the embedded hydrogel contact lens. The insert can be made of a polymeric material that can be a non-hydrogel material or a hydrogel material. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, etc.

In accordance with the invention, a non-hydrogel material can be any material that can absorb less than 5% (preferably about 4% or less, more preferably about 3% or less, even more preferably about 2% or less) by weight of water when being fully hydrated.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C=C< group. Exemplary ethylenically unsaturated groups include without limitation (meth)acryloyl

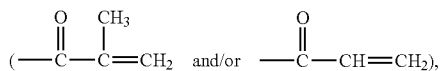

allyl, vinyl, styrenyl, or other C=C containing groups.

An "acrylic monomer" refers to a vinylic monomer having one sole (meth)acryloyl group. Examples of acrylic monomrs includes (meth)acryloxy [or(meth)acryloyloxy] monomers and (meth)acrylamido monomers.

An "(meth)acryloxy monomer" or "(meth)acryloyloxy monomer" refers to a vinylic monomer having one sole group of

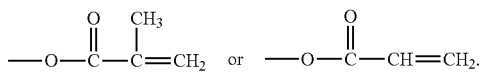

An "(meth)acrylamido monomer" refers to a vinylic monomer having one sole group of

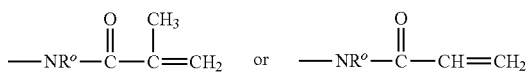

in which R° is H or $C_1$-$C_4$ alkyl.

The term "aryl acrylic monomer" refers to an acrylic monomer having at least one aromatic ring.

An "(meth)acryloxy monomer" or "(meth)acryloyloxy monomer" refers to a vinylic monomer having one sole group of

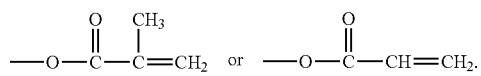

An "(meth)acrylamido monomer" refers to a vinylic monomer having one sole group of

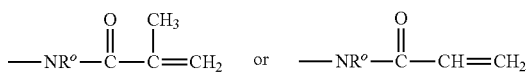

in which R° is H or $C_1$-$C_4$ alkyl.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH=$CH_2$) that is directly attached to the nitrogen atom of the amide group.

An "ene monomer" refers to a vinylic monomer having one sole ene group.

An "ene group" refers to a group of

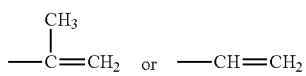

that is not directly linked to a nitrogen atom, an oxygen atom or a carbonyl group.

A "hydrophilic vinylic monomer", a "hydrophilic acrylic monomer", a "hydrophilic (meth)acryloxy monomer", or a "hydrophilic (meth)acrylamido monomer", as used herein, respectively refers to a vinylic monomer, an acrylic monomer, a (meth)acryloxy monomer, or a (meth)acrylamido monomer), which typically yields a homopolymer that is water-soluble or can absorb at least 10 percent by weight of water.

A "hydrophobic vinylic monomer", a "hydrophobic acrylic monomer", a "hydrophobic (meth)acryloxy monomer", or a "hydrophobic (meth)acrylamido monomer", as used herein, respectively refers to a vinylic monomer, an acrylic monomer, a (meth)acryloxy monomer, or a (meth)acrylamido monomer), which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

The term "acrylic repeating units" refers to repeating units of a polymeric material, each of which is derived from an acrylic monomer or crosslinker in a free-radical polymerization to form the polymeric material.

The term "terminal (meth)acryloyl group" refers to one (meth)acryloyl group at one of the two ends of the main chain (or backbone) of an organic compound as known to a person skilled in the art.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

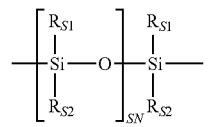

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}$'), amino linkages of —$NR_{N1}$—, amide linkages of —$CONR_{N1}$—, amide of —$CONR_{N1}R_{N1}$', urethane linkages of —OCONH—, and $C_1$-$C_4$ alkoxy group, or a linear hydrophilic polymer chain, in which $R_{N1}$ and $R_{N1}$' independent of each other are hydrogen or a $C_1$-$C_{15}$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater, preferably 90% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates free radical crosslinking/polymerizing reaction by the use of heat energy.

The "oxygen permeability", $Dk_t$, of a material is the rate at which oxygen will pass through a material and can be measured at about 34-35° C. according to the procedures described in Example 1. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

The term "modulus" or "elastic modulus" in reference to a contact lens or a material means the tensile modulus or Young's modulus which is a measure of the stiffness of a contact lens or a material. The modulus can be measured according to the procedures described in Example 1.

An "unprocessed state" refers to an insert which is obtained by cast-molding of a polymerizable composition in a mold and has not been subjected to extraction and/or hydration post-molding processes (i.e., having not been in contact with water or any organic solvent or any liquid after molding).

In general, the invention is directed to a method for producing embedded hydrogel contact lenses having an insert that is embedded completely or partially in the bulk hydrogel material of the embedded hydrogel contact lens and comprises magnetic particles. This invention is based on the discovery that an insert having magnetic particles thereon and therein (i.e., a magnetized insert) can be centered or positioned in any desired position in a lens mold for molding a contact lens by using a magnet placed below the lens mold. With the use of a magnetized insert in combination with a magnet, the accurately positioning of inserts during molding in a method of the invention can be achieved. The use of magnetized insert can simplify the process for producing embedded hydrogel contact lenses and enable the process to be implemented readily in an automatic production. Furthermore, a method of the invention can avoid the use of positioning guides (posts) and eliminate holes derived from the positioning guides (posts), thereby eliminating protein and/or bioburden buildup in those holes in the embedded hydrogel contact lenses.

In some aspects, the invention provides a method for producing embedded hydrogel contact lenses, the method of invention comprising the steps of: (1) obtaining a magnetized insert which comprises a front surface, an opposite back surface and a diameter up to about 13.0 mm, wherein the insert is made of a polymeric material and comprises magnetic particles; (2) obtaining a lens mold, wherein the lens mold comprises a female mold half having a first molding surface and a male mold half having a second molding surface, wherein the female and male mold halves are configured to receive each other such that a mold cavity is formed between the first and second molding surfaces when the mold is closed; (3) in no particular order, placing the magnetized insert in the lens mold and introducing a lens-forming composition in the lens mold, wherein the magnetized insert is immersed in the lens-forming composition in the lens mold and centered and held in position in the lens mold by using a magnet which is place below the lens mold; (4) curing the lens-forming composition in the lens mold while holding the magnetized insert centered in the lens mold by the magnet to form an unprocessed embedded hydrogel contact lens that comprise a bulk hydrogel material formed from the lens-forming composition and the magnetized insert embedded in the bulk hydrogel material and centered in the unprocessed embedded hydrogel contact lens; (5) separating the lens mold obtained in step (4) into the male and female mold halves, with the unprocessed embedded hydrogel contact lens adhered on a lens-adhered mold half which is one of the male and female mold halves; (6) removing the unprocessed embedded hydrogel contact lens from the lens-adhered mold half (preferably before the unprocessed embedded hydrogel contact lens is contact with water or any liquid); and (7) subjecting the unprocessed embedded hydrogel contact lens to post-molding processes including a hydration process and one or more other processes selected from the group consisting of extraction, surface treatment, packaging, sterilization, and combinations thereof.

In other aspects, the invention provides an embedded hydrogel contact lens, comprising: an anterior surface, an opposite posterior surface, a bulk hydrogel material, and a magnetized insert embedded in the bulk hydrogel material, wherein the magnetized insert is made of a polymeric material and comprises magnetic particles, wherein the magnetized insert has a front surface, an opposite back surface and a diameter up to about 13.0 mm, wherein the magnetized insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

Methods of manufacturing mold halves for cast-molding a contact lens or an insert are generally well known to those of ordinary skill in the art. The process of the present invention is not limited to any particular method of forming a mold half. In fact, any method of forming a mold half can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

In this application, a "magnetized insert" refers to an insert comprising magnetic particles therein and/or thereon.

Any magnetic particles can be used in the invention. Nano- and micro-sized magnetic particles are well known in the art and have been used in magnetic particles imaging (MPI), separation and inspections as well as in the biomedical, energy, electronic and environmental fields (see, Colloidal Metal Oxide Nanoparticles: Synthesis, Characterization and Applications (Metal Oxides), Ed. by S Thomas, A. T. Sunny and P. Velayudhan, Elsevier; 1$^{st}$ Edition (Sep. 15, 2019)). Magnetic particles with a wide range of particles sizes can be obtained from commercial sources, e.g., Chemcell GmbH (Berlin, Germany), Creative Diagnostics (Shirley, NY), etc. or can be prepared according any methods known to person skilled in the art (see, e.g., U.S. Pat. Nos. 3,926,659, 6,302,952, 9,846,263, and 10,253,191; and U.S. Pat. Appl. Pub. Nos. 2004/0038355, 2007/0032573, and 2009/0255442).

In a preferred embodiment, a magnetized insert is made of a polymeric material and comprises magnetic particles distributed in the polymeric material. This type of magnetized inserts can be obtained by cast-molding of an insert-forming composition (i.e., a polymerizable composition for molding inserts) comprising magnetic particles.

In another preferred embodiment, a magnetized insert is made of a polymeric material and has a magnetic coating thereon. This type of magnetized inserts can be obtained by applying a magnetic coating composition onto one of the front and back surface of a preformed insert. A magnetic coating composition comprises magnetic particle and can be prepared by adding the magnetic particles in any coating composition known to a person skilled in the art.

In another preferred embodiment, a magnetic insert is made of a polymeric material and comprises a magnetic color image thereon.

A "magnetic color image" refers to any cosmetic patterns, for example, annular rings (e.g., as shown in FIGS. 1-6 of U.S. Pat. No. 8,770,747, FIGS. 1-7 of U.S. Pat. No. 9,039,173, and FIGS. 1-8 of U.S. Pat. No. 10,156,736, simulated iris patterns (e.g., as shown in U.S. Pat. Nos. 3,536,386; 3,679,504; 3,712,718; 4,460,523; 4,582,402; 4,634,449; 4,719,657; 4,744,647; 5,120,121; 5,414,477; 5,793,466, 7,278,736), Wild Eye™ patterns, which are printed onto one of the front and back surfaces of a preformed insert with an ink comprising magnetic particles.

Any inks can be used in the invention, so long as they comprise magnetic particles. Generally, an ink comprises pigment particles and at least one binder polymer and a solvent. It optionally includes a crosslinker, a humectant, a surfactant, a monomer, a polymerization initiator, an antimicrobial agent, an antioxidant agent, an anti-kogating agent, and other additives known in the art. A person skilled in the art knows well how to prepare an ink for printing a color image on a preformed contact lens. Numerous inks for printing color images on a contact lens are known in the art and have been disclosed in numerous patents. An ink comprising magnetic particles can be prepared by adding magnetic particles in any known inks or by mixing all the required components including magnetic particles in a solvent.

A person skilled in the art knows how to obtain a preformed insert having a magnetic color image thereon according to any known methods.

One of the well-known methods involves directly printing an ink having magnetic particles on at least one of the front and back surfaces of a preformed insert, according to pad transferring printing and/or inkjet printing technique.

Pad transfer printing is well known in the art (see. For example, U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a preformed insert or a mold for molding an insert. Appropriate pad-transfer printing structures include, but are not limited to, Tampo-type printing structures (Tampo vario 90/130), rubber stamps, thimbles, doctor's blade, direct printing, or transfer printing as they are known in the art.

Any known suitable silicone pad can be used in the present invention. Silicone pads are commercially available. However, different pads could give different print qualities. A person skilled in the art will know how to select a pad for a given ink.

Clichés can be made of ceramics or metals (e.g., steel). Where a cliché is made of a steel, it would be desirable to neutralize the pH of a water-based ink (e.g., adjusted pH to 6.8~7.8) by adding a buffer (such as, for example, phosphate salts). Images can be etched into a cliché according to any methods known to a person skilled in the art, for example, by chemical etching or laser ablation or the like. It is also desirable to clean clichés after use using standard cleaning techniques known to a person skilled in the art, such as, for example, immersion in a solvent, sonication, or mechanical abrasion.

It is understood that either the front surface and/or the back surface of the preformed insert may be printed.

Printing the preformed insert using an inkjet printing process similar to what is described in published US Pat. Appl. Pub. Nos. 2001/0050753, 2001/0085934, 2003/0119943, and 2003/0184710.

Alternatively, a preformed insert having a magnetic color image thereon can be made according to a print-on-mold process similar to those described in U.S. Pat. No. 5,034,166. An ink can be applied first on the molding surface of one or both mold halves by using pad transfer printing (or pad printing) or inkjet printing to form a magnetic colored coat (with a magnetic color image). A magnetic colored coat can be applied on a molding surface defining the front or back surface of an insert to be molded or on both the molding surfaces defining the front and back surfaces respectively of an insert to be molded.

After printing an ink on a molding surface of a mold, the printed ink can be cured thermally or actinically. It is desirable that the printed ink is cured actinically to an extent to minimize loss of pattern definition of the magnetic color image resulted from subsequent filling of an insert-forming composition. Then, an insert-forming composition is introduced in the mold comprising the magnetic color image printed on the molding surface and subsequently cured to form the magnetic insert having a magnetic color image on one of the front and back surfaces thereof.

Any polymerizable compositions, such as those known to be suitable for making hard, soft, non-silicone hydrogel, and silicone hydrogel contact lenses and for making intraocular lenses, can be used as lens-forming composition.

In a preferred embodiment, a magnetized insert is made of a hard plastics (preferably a crosslinked polymethylmethacrylate).

In another preferred embodiment, a magnetized insert is made of a crosslinked silicone polymer (or a silicone rubber or elastomer as known to a person skilled in the art). A crosslinked silicone material has three-dimensional polymer networks (i.e., polymer matrix), is insoluble in water, and has an equilibrium water content of about 5% or less, preferably about 3% or less, more preferably about 2% or less) by weight (i.e., in fully-hydrated state).

In another preferred embodiment, a magnetized insert is made of a non-silicone hydrogel material (any one of those described later in this application).

In another preferred embodiment, a magnetized insert is made of a silicone hydrogel material (any one of those described later in this application).

In another preferred embodiment, a magnetized insert is made of a rigid gas permeable material (e.g., a material made from fluorosilicone acrylates).

In another preferred embodiment, a magnetized insert comprises repeating units of at least one polymerizable photochromic compound (i.e., at least one photochromic vinylic monomer), at least one UV-absorbing vinylic monomer, at least one UV/HEVL-absorbing vinylic monomer, a fluorescent vinylic monomer, or combinations thereof.

In another preferred embodiment, a magnetized insert comprises at least one photochromic dye or pigment, at least one color-filtering material for correcting color blindness, a diffractive material, a high refractive-index material, or combinations.

In another preferred embodiment, a magnetized insert is made of a hydrophobic crosslinked acrylic material that has an equilibrium water content of less than 5% by weight and comprises at least about 55% (preferably at least about 60%, more preferably at least about 65% even more preferably at least about 70%) by mole of repeating units of one or more acrylic monomers and/or one or more acrylic crosslinker or crosslinking agent and at least about 6% by mole (preferably at least about 8% by mole, more preferably at least about 10% by mole, even more preferably at least about 12% by mole) of repeating units at least one vinylic crosslinking agent.

Any hydrophobic acrylic monomers can be used in forming a hydrophobic material of the inventions. Examples of hydrophobic acrylic monomers includes silicone-containing acrylic monomers (any one of those described below in this application), non-silicone hydrophobic acrylic monomers (any one of those described below in this application), fluorine-containing acrylic monomers (any one of those described below in this application), aryl acrylic monomers as described below, and combinations thereof.

In accordance with a preferred embodiment of the invention, the hydrophobic crosslinked acrylic material comprises an aryl vinylic monomer of formula (I) or (II)

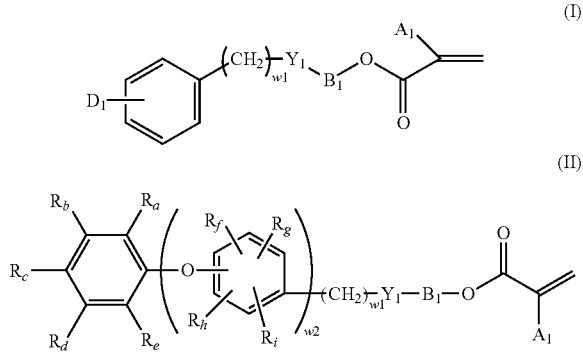

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

Examples of aryl acrylic monomers of formula (I) include, but are not limited to those described later in this application. Aryl acrylic monomers of formula (I) can be obtained from commercial sources or alternatively prepared according to methods known in the art.

Preferred aryl acrylic monomers of formula (I) are those wherein $B_1$ is $OCH_2CH_2$, $(OCH_2CH_2)_2$, $(OCH_2CH_2)_3$, or $(CH_2)_{m1}$ in which m1 is 2-5, $Y_1$ is a direct bond or O, w1 is 0 or 1, and $D_1$ is H. Most preferred are 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates.

Aryl acrylic monomers of formula (II) can be prepared from monofunctional polyphenyl ethers (i.e., ones with one functional group such as hydroxyl, amino, or carboxyl groups). Generally, a monofunctional OH-terminated poly (phenyl ether) is reacted with a (meth)acrylic acid derivative (such as acryloyl chloride, methacryloyl chloride, methacrylic anhydride, or an isocyanatoalkyl acrylate or methacrylate) under coupling reaction conditions known to a person skilled in the art. Mono-amine and mono-carboxylic acid terminated polyphenyl ethers are functionalized in a similar manner using suitable (meth)acrylic acid derivatives. Monofunctional terminated polyphenyl ethers can be prepared according to procedures described in literature (*J. Org. Chem.*, 1960, 25 (9), pp 1590-1595). The experiment procedures for preparing aryl acrylic monomers of formula (II) can be found in U.S. Pat. No. 10,064,977.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described above in this application), vinyloxyalkanes (any one of those described above in this application), and combinations thereof.

It is understood that the mole percentages of each of the components of the hydrophobic crosslinked acrylic material can be obtained based on the mole percentages of its corresponding polymerizable component (material) in an insert-forming composition for making the insert.

In accordance with the invention, a hydrophobic crosslinked acrylic material comprises repeating units of at least one vinylic crosslinking agent. Any suitable vinyl crosslinking agents can be used in the invention. Examples of preferred vinylic cross-linking agents include without limitation: acrylic crosslinking agents (crosslinkers) (any one of those described later in this application), allyl methacrylate, allyl acrylate, an aryl crosslinking agent (e.g., divinylbenzene, 2-methyl-1,4-divinylbenzene, bis(4-vinylphenyl) methane, 1,2-bis(4-vinylphenyl)ethane, etc.), triallyl isocyanurate, 2,4,6-triallyloxy-1,3,5-triazine, 1,2,4-trivinylcyclohexane, or combinations thereof. It is understood that vinylic crosslinking agents are required for imparting the desired rigidity to the crosslinked polymeric material of the rigid hydrophobic insert.

In a preferred embodiment, the hydrophobic crosslinked acrylic material comprises repeating units of at least one acrylic crosslinking agent (any one of those described later in this application).

In another preferred embodiment, the hydrophobic crosslinked acrylic material comprises repeating units of at least one aryl crosslinking agent (any one of those described later in this application).

In another preferred embodiment, the hydrophobic crosslinked acrylic material comprises repeating units of at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or combinations thereof.

An insert-forming composition can be prepared by mixing all polymerizable materials as described above in the desired proportions, together with one or more polymerization initiators (thermal polymerization initiators or photoinitiators) in the presence or preferably in the absence of a non-reactive organic solvent (i.e., a non-reactive diluent) as described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoyl-phosphine oxide, 1-hydroxycyclohexyl phenyl ketone and Darocur and Irgacur types, preferably Darocur 1173® and Darocur 2959®, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenyl-phosphine oxide; and bis-(2,6-dichlorobenzoyl)-4-N-butylphenylphosphine oxide. Reactive photoinitiators which can be incorporated, e.g., into a macromer or can be used as a special monomer are also suitable. Examples of reactive photoinitiators are those disclosed in EP632329.

In accordance with the invention, the bulk hydrogel material (formed from a lens-forming composition) can be a non-silicone hydrogel material (any one of those described later in this application), or preferably a silicone hydrogel material (any one of those described later in this application).

A non-silicone hydrogel material can be formed from a polymerizable composition (such as one for forming a non-silicone hydrogel contact lens). Typically, a polymerizable composition for forming a non-silicone hydrogel material is either (1) a monomer mixture comprising (a) at least one hydrophilic vinylic monomer (e.g., hydroxyl-containing vinylic monomer, N-vinylpyrrolidone, or combinations thereof) and (b) at least one component selected from the group consisting of a crosslinking agent, a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous polymerizable composition for forming non-silicone hydrogel materials have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Preferably, a non-silicone hydrogel material comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol.

A silicone hydrogel material can be formed from a polymerizable composition (such as one for forming a silicone hydrogel contact lens). Numerous polymerizable compositions for forming silicone hydrogel materials have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition of the invention.

Preferably, a silicone hydrogel material comprises (a) repeating units of at least one first polysiloxane vinylic crosslinker comprising hydrophilized siloxane units each having one methyl substituent and one organic radical including at least one H-bond donor (preferably hydroxyl groups) and (b) repeating units of at least one hydrophilic vinylic monomer, wherein the content of said at least one H-bond donor is at least about 0.8 meq/g (preferably at least about 1.0 meq/g, more preferably at least about 1.2 meq/g, even more preferably at least about 1.4 meq/g) relative to the molecular weight of said at least one first polysiloxane vinylic crosslinker.

In accordance with the invention, any polysiloxane vinylic crosslinkes can be used in the invention as the first polysiloxane vinylic crosslinkers, so long as they comprises hydrophilized siloxane units each having one methyl substituent and one organic radical having at least one H-bond donor (preferably hydoxyl group). Examples of a class of preferred polysiloxane vinylic crosslinkers are di-(meth) acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (G), as described later in this application. They can be prepared according to the procedures disclosed in U.S. Pat. No. 10,081,697.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, the silicone hydrogel material can further comprise repeating units of a silicone-containing vinylic monomer and/or a second polysiloxane vinylic crosslinker (other than the first polysiloxane vinylic crosslinker).

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, 3-methacryloxy propyl pentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166, 236, 6,867,245, 8,415,405, 8,475,529, 8,614,261, and 9,217, 813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention as the second polysiloxane vinylic crosslinkers. Examples of preferred polysiloxane vinylic crosslinkers as the second polysiloxane vinylic crosslinker are di-(meth)acryloyl-terminated polydimethyl-siloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153, 641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260, 725, and 4,261,875.

One class of preferred polysiloxane vinylic crosslinkers as the second polysiloxane vinylic crosslinker are vinylic crosslinkers each of which comprises one sole polydiorganosiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyanatoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers as the second polysiloxane vinylic crosslinker are chain-extended polysiloxane vinylic crosslinkers each of which has at least two polydiorganosiloxane segments linked by a linker between each pair of polydiorganosiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 10,301,451, and 10,465,047.

In accordance with the invention, the silicone hydrogel material can also comprise repeating units of one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth) acrylonitrile, etc.), fluorine-containing acrylic monomers (e.g., perfluorohexylethyl-thio-carbonyl-aminoethyl-methacrylate, perfluoro-substituted-$C_2$-$C_{12}$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isoputyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth) acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth) acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth) acrylate, and combinations thereof.

In accordance with the invention, the silicone hydrogel material can also comprise repeating units of one or more non-silicone vinylic crosslinkers. Examples of preferred non-silicone vinylic cross-linking agents are described later in this application.

In accordance with the invention, the silicone hydrogel material can also comprises repeating units of other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a preformed SiHy contact lens of the invention. Examples of preferred UV-absorbing and UV/HEVL-absorbing vinylic monomers include without limitation: 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5'-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS #96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS #83063-87-0). In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro(indoline)naphthoxazines, polymerizable spiro(indoline) pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In a preferred embodiment, the silicone hydrogel material comprises at least about 5% (preferably at least about 10%, more preferably at least about 15%, even more preferably at least about 20%, most preferably at least about 25%) by weight of repeating units of the first polysiloxane vinylic crosslinker.

In accordance with the invention, the silicone hydrogel material has an equilibrium water content (i.e., in fully hydrated state or when being fully hydrated) of from about 20% to about 70% (preferably from about 20% to about 65%, more preferably from about 25% to about 65%, even more preferably from about 30% to about 60%) by weight, an oxygen permeability of at least about 40 barrers (preferably at least about 60 barrers, more preferably at least about 80 barrers, more preferably at least about 100 barrers), and a modulus (i.e., Young's modulus) of about 1.5 MPa or less (preferably from about 0.2 MPa to about 1.2 MPa, more preferably from about 0.3 MPa to about 1.1 MPa, even more preferably from about 0.4 MPa to about 1.0 MPa).

A lens-forming composition or an insert-forming composition (i.e., a polymerizable composition) can be a solventless clear liquid prepared by mixing all polymerizable components (or materials) and other necessary component (or materials) or a solution prepared by dissolving all of the desirable components (or materials) in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction (any of those solvents as described later in this application).

A solventless polymerizable composition typically comprises at least one blending vinylic monomer as a reactive solvent for dissolving all other polymerizable components. Examples of preferred blending vinylic monomers are described later in this application. Preferably, methyl methacrylate is used as a blending vinylic monomer in preparing a solventless polymerizable composition.

Examples of suitable solvents include acetone, methanol, cyclohexane, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. More preferred organic solvents include without limitation methanol, ethanol, 1-propanol, isopropanol, sec-butanol, tert-butyl alcohol, tert-amyl alcohol, acetone, methyl ethyl ketone, methyl isopropyl ketone, methyl propyl ketone, ethyl acetate, heptane, methylhexane (various isomers), methylcyclohexane, dimethylcyclopentane (various isomers), 2,2,4-trimethylpentane, and mixtures thereof.

The insert-forming composition and the lens-forming composition can be introduced into the insert-molding cavity and the lens-molding cavity respectively according any techniques known to a person skilled in the art.

The curing of a polymerizable composition within the insert-molding or lens-molding cavity of a mold can be carried out thermally (i.e., by heating) or actinically (i.e., by actinic radiation, e.g., UV radiation and/or visible radiation) to activate the polymerization initiators.

The actinic polymerization of the polymerizable composition in a mold can be carried out by irradiating the closed mold with the polymerizable composition therein with an UV or visible light, according to any techniques known to a person skilled in the art.

The thermal polymerization of the polymerizable composition in a mold can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

After the curing step and optionally the post-curing step, the steps of opening a mold (i.e., separating the male mold half from the female mold half with the unprocessed embedded silicone hydrogel contact lens attached onto one of the male and female mold halves) and delensing (i.e., removing the unprocessed embedded silicone hydrogel contact lens from the lens-adhered mold half) are carried out according to any techniques known to a person skilled in the art.

After the unprocessed embedded hydrogel contact lens is delensed, it typically is extracted with an extraction medium as well known to a person skilled in the art. The extraction liquid medium is any solvent capable of dissolving the diluent(s), unpolymerized polymerizable materials, and oligomers in the unprocessed embedded silicone hydrogel contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for producing embedded hydrogel contact lenses, comprising the steps of:
   (1) obtaining a magnetized insert which comprises a front surface, an opposite back surface and a diameter up to about 13.0 mm, wherein the insert is made of a polymeric material and comprises magnetic particles;
   (2) obtaining a lens mold, wherein the lens mold comprises a female mold half having a first molding surface and a male mold half having a second molding surface, wherein the female and male mold halves are configured to receive each other such that a mold cavity is formed between the first and second molding surfaces when the mold is closed;
   (3) in no particular order, placing the magnetized insert in the lens mold and introducing a lens-forming composition in the lens mold, wherein the magnetized insert is immersed in the lens-forming composition in the lens mold and centered and held in position in the lens mold by using a magnet which is place below the lens mold;
   (4) curing the lens-forming composition in the lens mold while holding the magnetized insert centered in the lens mold by the magnet to form an unprocessed embedded hydrogel contact lens that comprise a bulk hydrogel material formed from the lens-forming composition and the magnetized insert embedded in the bulk hydrogel material and centered in the unprocessed embedded hydrogel contact lens;
   (5) separating the lens mold obtained in step (4) into the male and female mold halves, with the unprocessed embedded hydrogel contact lens adhered on a lens-adhered mold half which is one of the male and female mold halves;
   (6) removing the unprocessed embedded hydrogel contact lens from the lens-adhered mold half (preferably before the unprocessed embedded hydrogel contact lens is contact with water or any liquid); and
   (7) subjecting the unprocessed embedded hydrogel contact lens to post-molding processes including a hydration process and one or more other processes selected from the group consisting of extraction, surface treatment, packaging, sterilization, and combinations thereof.

2. The method of embodiment 1, wherein the step of (4) curing the lens-forming composition is carried out actinically by using UV and/or visible light.

3. The method of embodiment 1, wherein the step of (4) curing the lens-forming composition is carried out thermally by heating the first molding assembly in an oven at one or more curing temperatures selected from about 40° C. to about 100° C.

4. An embedded hydrogel contact lens, comprising:
   an anterior surface, an opposite posterior surface, a bulk hydrogel material, and a magnetized insert embedded in the bulk hydrogel material,
   wherein the magnetized insert is made of a polymeric material and comprises magnetic particles, wherein the magnetized insert has a front surface, an opposite back surface and a diameter up to about 13.0 mm, wherein the magnetized insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

5. The method of any one of embodiments 1-3 or the embedded hydrogel contact lens of embodiment 4, wherein the magnetized insert comprises the magnetic particles which are distributed in the polymeric material of the magnetized insert.

6. The method of any one of embodiments 1-3 and 5 or the embedded hydrogel contact lens of embodiment 4 or 5, wherein the magnetized insert comprises a magnetic coating on one of the front and back surfaces, wherein the magnetic coating comprises the magnetic particles.

7. The method of any one of embodiments 1-3 and 5 or the embedded hydrogel contact lens of embodiment 4 or 5, wherein the magnetized insert comprises a magnetic color image printed on one of the front and back surfaces with at least one ink comprising magnetic particles, wherein the magnetic color image is comprises the magnetic particles.

8. The method or embedded hydrogel contact lens of embodiment 7, wherein the magnetic color image comprises an annular ring.

9. The method of any one of embodiments 1-3 and 5-8 or the embedded hydrogel contact lens of any one of embodiments 4-8, wherein the polymeric material of the magnetized insert comprises repeating units of at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.

10. The method of any one of embodiments 1-3 and 5-8 or the embedded hydrogel contact lens of any one of embodiments 4-8, wherein the magnetized insert comprises at least one color-filtering material for correcting color blindness, a diffractive material, a high refractive-index material, or combinations.

11. The method of any one of embodiments 1-3 and 5-10 or the embedded hydrogel contact lens of any one of embodiments 4-10, wherein the polymeric material of the magnetized insert is a hard plastics.

12. The method or the embedded hydrogel contact lens of embodiment 11, wherein the hard plastics is a crosslinked polymethylmethacrylate.

13. The method of any one of embodiments 1-3 and 5-10 or the embedded hydrogel contact lens of any one of embodiments 4-10, wherein the polymeric material of the magnetized insert is a crosslinked silicone polymer that has three-dimensional polymer networks, is insoluble in water, and has an equilibrium water content of about 5% or less (preferably about 3% or less, more preferably about 2% or less) by weight.

14. The method or the embedded hydrogel contact lens of embodiment 13, wherein the crosslinked silicone polymer has an equilibrium water content of about 3% or less (preferably about 2% or less) by weight.

15. The method of any one of embodiments 1-3 and 5-10 or the embedded hydrogel contact lens of any one of embodiments 4-10, wherein the polymeric material of the magnetized insert is a rigid gas permeable material.
16. The method of any one of embodiments 1-3 and 5-10 or the embedded hydrogel contact lens of any one of embodiments 4-10, wherein the polymeric material of the magnetized insert is a hydrophobic crosslinked acrylic material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent.
17. The method or embedded hydrogel contact lens of embodiment 16, wherein the hydrophobic crosslinked acrylic material has an equilibrium water content of about 4% or less by weight.
18. The method or embedded hydrogel contact lens of embodiment 16, wherein the hydrophobic crosslinked acrylic material has an equilibrium water content of about 3% or less by weight.
19. The method or embedded hydrogel contact lens of embodiment 16, wherein the hydrophobic crosslinked acrylic material has an equilibrium water content of about 2% or less by weight.
20. The method or embedded hydrogel contact lens of any one of embodiments 16 to 19, wherein the hydrophobic crosslinked acrylic material comprises at least about 60% by mole of repeating units of said one or more acrylic monomers and/or said one or more acrylic crosslinker.
21. The method or embedded hydrogel contact lens of any one of embodiments 16 to 19, wherein the hydrophobic crosslinked acrylic material comprises at least about 65% by mole of repeating units of said one or more acrylic monomers and/or said one or more acrylic crosslinker.
22. The method or embedded hydrogel contact lens of any one of embodiments 16 to 19, wherein the hydrophobic crosslinked acrylic material comprises at least about 70% by mole of repeating units of said one or more acrylic monomers and/or said one or more acrylic crosslinker.
23. The method or embedded hydrogel contact lens of any one of embodiments 16 to 22, wherein the crosslinked polymeric material comprises at least about 8% by mole of repeating units of said at least one vinylic crosslinking agent.
24. The method or embedded hydrogel contact lens of any one of embodiments 16 to 22, wherein the hydrophobic crosslinked acrylic material comprises at least about 10% by mole of repeating units of said at least one vinylic crosslinking agent.
25. The method or embedded hydrogel contact lens of any one of embodiments 16 to 22, wherein the hydrophobic crosslinked acrylic material comprises at least about 12% by mole of repeating units of said at least one vinylic crosslinking agent.
26. The method or embedded hydrogel contact lens of any one of embodiments 16 to 25, wherein said at least one vinylic crosslinking agent comprises at least one acrylic crosslinking agent.
27. The method or embedded hydrogel contact lens of embodiment 26, wherein said at least one acrylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloylpropane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.
28. The method or embedded hydrogel contact lens of embodiment 26, wherein said at least one acrylic crosslinking agent is allyl methacrylate, allyl acrylate, an aryl crosslinking agent, triallyl isocyanurate, 2,4,6-triallyloxy-1,3,5-triazine, 1,2,4-trivinylcyclohexane, or combinations thereof.
29. The method or embedded hydrogel contact lens of embodiment 26, wherein said at least one acrylic crosslinking agent is divinylbenzene, 2-methyl-1,4-divinylbenzene, bis(4-vinylphenyl)methane, 1,2-bs(4-vinylphenyl)ethane, or combinations thereof.
30. The method or embedded hydrogel contact lens of any one of embodiments 16 to 29, wherein the hydrophobic crosslinked acrylic material comprises repeating units of at least one acrylic monomer which comprises a silicone-containing acrylic monomer, a non-silicone hydrophobic acrylic monomer, a fluorine-containing acrylic monomer, an aryl acrylic monomer, or a combination thereof.
31. The method or embedded hydrogel contact lens of any one of embodiments 16 to 29, wherein the hydrophobic crosslinked acrylic material comprises repeating units of at least one non-silicone hydrophobic acrylic monomer.
32. The method or embedded hydrogel contact lens of embodiment 31, wherein said at least one non-silicone hydrophobic acrylic monomer is (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, or combinations thereof.
33. The method or embedded hydrogel contact lens of any one of embodiments 16 to 32, wherein the hydrophobic crosslinked acrylic material comprises repeating units of at least one fluorine-containing acrylic monomer.
34. The method or embedded hydrogel contact lens of embodiment 33, wherein said at least one fluorine-containing acrylic monomer is perfluorohexylethyl-thio-carbonyl-aminoethyl-methacrylate, 2,2,2-trifluoroethyl (meth)acrylate, tetrafluoropropyl (meth)acrylate, hexafluoro-iso-propyl (meth)acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth)acrylate, or combinations thereof.

35. The method or embedded hydrogel contact lens of any one of embodiments 16 to 34, wherein the hydrophobic crosslinked acrylic material comprises repeating units of at least one silicone-containing acrylic monomer.
36. The method or embedded hydrogel contact lens of any one of embodiments 16 to 35, wherein the hydrophobic crosslinked acrylic material comprises repeating units of at least one polysiloxane vinylic crosslinker.
37. The method or embedded hydrogel contact lens of embodiment 36, wherein said at least polysiloxane vinylic crosslinker comprises at least 30% by mole of siloxane units each having at least one phenyl substituent.
38. The method or embedded hydrogel contact lens of embodiment 36, wherein said at least polysiloxane vinylic crosslinker comprises at least 60% by mole of siloxane units each having at least one phenyl substituent.
39. The method or embedded hydrogel contact lens of embodiment 36, wherein said at least polysiloxane vinylic crosslinker comprises at least 90% by mole of siloxane units each having at least one phenyl substituent.
40. The method or embedded hydrogel contact lens of embodiment 36, wherein said at least polysiloxane vinylic crosslinker comprises three or more vinylphenylsiloxane units each having at least one phenyl substituent and one vinyl substituent.
41. The method or embedded hydrogel contact lens of embodiment 36, wherein said at least polysiloxane vinylic crosslinker comprises three or more phenylmethylsiloxane units.
42. The method or embedded silicone hydrogel contact lens of embodiment 36, wherein said at least polysiloxane vinylic crosslinker comprises three or more diphenylsiloxane units.
43. The method or embedded hydrogel contact lens of embodiment 36, wherein said at least polysiloxane vinylic crosslinker comprises one or more vinyl terminated polyphenylmethysiloxanes, one or more vinylphenylmethyl terminated phenylmethyl-vinylphenylsiloxane copolymers, one or more vinyl terminated diphenylsiloxane-dimethylsiloxane copolymers, or combinations thereof.
44. The method or embedded hydrogel contact lens of embodiment 36, wherein said at least polysiloxane vinylic crosslinker comprises one or more vinyl terminated polyphenylmethysiloxanes.
45. The method or embedded hydrogel contact lens of embodiment 36, wherein said at least polysiloxane vinylic crosslinker comprises one or more vinylphenylmethyl terminated phenylmethyl-vinylphenylsiloxane copolymers.
46. The method or embedded hydrogel contact lens of any one of embodiments 16 to 45, wherein the hydrophobic crosslinked acrylic material comprises repeating units of at least one aryl acrylic monomer of formula (I) or (II)

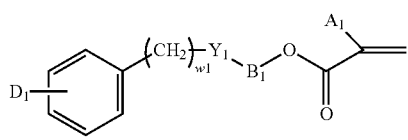

(I)

-continued

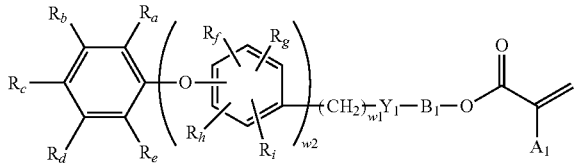

(II)

wherein $A_1$ is H or $CH_3$ (preferably H); $B_1$ is $(CH_2)_{m1}$ or $[O(CH_2)_2]_{z1}$ in which m1 is 2-6 and z1 is 1-10; $Y_1$ is a direct bond, O, S, or NR' in which R' is H, $CH_3$, $C_{n'}H_{2n'+1}$ in which n'=1-10, iso-$OC_3H_7$, $C_6H_5$, or $CH_2C_6H_5$; $R_a$, $R_b$, $R_c$, $R_d$, $R_e$, $R_f$, $R_g$, $R_h$, and $R_i$ independent of one another are H, $C_1$-$C_{12}$ alkyl, or $C_1$-$C_{12}$ alkoxy (preferably all are H); w1 is 0-6, provided that m1+w1≤8; w2 is an integer from 1 to 3; and $D_1$ is H, Cl, Br, $C_1$-$C_4$ alkyl, $C_1$-$C_4$ alkoxy, $C_6H_5$, or $CH_2C_6H_5$.

47. The method or embedded hydrogel contact lens of embodiment 46, wherein said at least one aryl acrylic monomer comprises at least one vinylic monomer selected from the group consisting of 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl)ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy]ethyl methacrylate, and combinations thereof.
48. The method or embedded hydrogel contact lens of embodiment 46, wherein said at least one aryl acrylic monomer comprises 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; 2-phenylethyl methacrylate; 3-phenylpropyl methacrylate; 4-phenylbutyl methacrylate; 5-phenyl pentyl methacrylate; 2-benzyloxyethyl methacrylate; 3-benzyloxypropyl methacrylate; 2-[2-(benzyloxy)ethoxy]ethyl methacrylate, or combinations thereof.
49. The method or embedded hydrogel contact lens of any one of embodiments 16 to 48, wherein the hydrophobic crosslinked acrylic material comprises repeating units of at least one hydrohobic vinylic monomer selected from the group consisting of a vinyl alkanoate, a vinyloxyalkane, styrene, vinyl toluene, vinyl chloride, vinylidene chloride, 1-butene, and combinations thereof.
50. The method or embedded hydrogel contact lens of any one of embodiments 16 to 49, wherein the hydrophobic insert is rigid.
51. The method of any one of embodiments 1-3 and 5-50 or the embedded hydrogel contact lens of any one of embodiments 4-50, wherein the bulk hydrogel material is a non-silicone hydrogel material comprising at least 50% by mole of repeating units of at least one hydroxyl-containing vinylic monomer.
52. The method or embedded hydrogel contact lens of embodiment 51, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.
53. The method of any one of embodiments 1-3 and 5-50 or the embedded hydrogel contact lens of any one of embodiments 4-50, wherein the bulk hydrogel material is a silicone hydrogel material
54. The method or embedded hydrogel contact lens of embodiment 53, wherein the bulk hydrogel material comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker.
55. The method or embedded hydrogel contact lens of embodiment 54, wherein said at least one first polysiloxane vinylic crosslinker comprises hydrophilized siloxane units each having one methyl substituent and one organic radical including at least one hydroxyl groups.
56. The method or embedded hydrogel contact lens of embodiment 54 or 55, wherein the content of said at least one H-bond donor is at least about 1.0 meq/g relative to the molecular weight of said at least one first polysiloxane vinylic crosslinker.
57. The method or embedded hydrogel contact lens of embodiment 54 or 55, wherein the content of said at least one H-bond donor is at least about 1.2 meq/g relative to the molecular weight of said at least one first polysiloxane vinylic crosslinker.
58. The method or embedded hydrogel contact lens of embodiment 54 or 55, wherein the content of said at least one H-bond donor is at least about 1.4 meq/g relative to the molecular weight of said at least one first polysiloxane vinylic crosslinker.
59. The method or embedded hydrogel contact lens of any one of embodiments 54 to 58, wherein said at least one first polysiloxane vinylic crosslinker comprises a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.
60. The method or embedded hydrogel contact lens of any one of embodiments 54 to 58, wherein said at least one first polysiloxane vinylic crosslinker comprises comprises a vinylic crosslinker of formula (G)

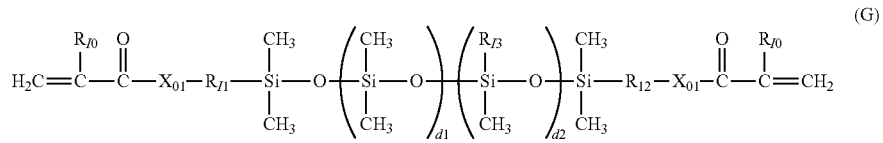

(G)

in which:
d1 is an integer of from 30 to 500 and d2 is an integer of from 1 to 75, provided that d2/d1 is from about 0.035 to about 0.15;

$X_{01}$ is O or $NR_{IN}$ in which $R_{IN}$ is hydrogen or $C_1$-$C_{10}$-alkyl;

$R_{I0}$ is hydrogen or methyl;

$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;

$R_{I3}$ is a monovalent radical of any one of formula (G-1) to (G-5)

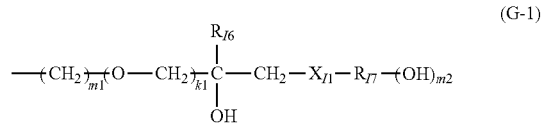

(G-1)

(G-2)

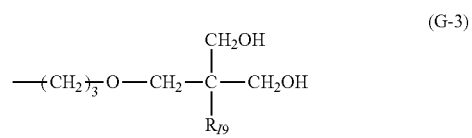

(G-3)

-continued

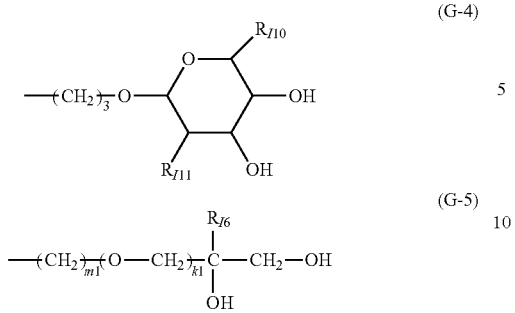

k1 is zero or 1; m1 is an integer of 2 to 4; m2 is an integer of 1 to 5; m3 is an integer of 3 to 6; m4 is an integer of 2 to 5;

$R_{J6}$ is hydrogen or methyl;

$R_{J7}$ is a $C_2$-$C_6$ hydrocarbon radical having (m2+1) valencies;

$R_{J8}$ is a $C_2$-$C_6$ hydrocarbon radical having (m4+1) valencies;

$R_{J9}$ is ethyl or hydroxymethyl;

$R_{J10}$ is methyl or hydromethyl;

$R_{J11}$ is hydroxyl or methoxy;

$X_{J1}$ is a sulfur linkage of —S— or a teriary amino linkage of —$NR_{J12}$— in which $R_{J12}$ is $C_1$-$C_1$ alkyl, hydroxyethyl, hydroxypropyl, or 2,3-dihydroxypropyl; and $X_{J2}$ is an amide linkage of

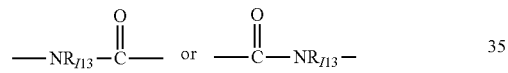

in which $R_{J13}$ is hydrogen or $C_1$-$C_{10}$ alkyl.

61. The method or embedded hydrogel contact lens of embodiment 60, wherein in formula (G) d2/d1 is from about 0.040 to about 0.12.
62. The method or embedded hydrogel contact lens of embodiment 60, wherein in formula (G) d2/d1 is from about 0.045 to about 0.10.
63. The method or embedded hydrogel contact lens of any one of embodiments 60 to 62, wherein in formula (G) $R_{J3}$ is a monovalent radical of formula (G-1).
64. The method or embedded hydrogel contact lens of any one of embodiments 60 to 62, wherein in formula (G) $R_{J3}$ is a monovalent radical of formula (G-2).
65. The method or embedded hydrogel contact lens of any one of embodiments 60 to 62, wherein in formula (G) $R_{J3}$ is a monovalent radical of formula (G-3).
66. The method or embedded hydrogel contact lens of any one of embodiments 60 to 62, wherein in formula (G) $R_{J3}$ is a monovalent radical of formula (G-4).
67. The method or embedded hydrogel contact lens of any one of embodiments 60 to 62, wherein in formula (G) $R_{J3}$ is a monovalent radical of formula (G-5).
68. The method or embedded hydrogel contact lens of any one of embodiments 54 to 67, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris (hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth) acrylic acid, ethylacrylic acid, 3-(emth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(emth)acrylamido-2methyl-3, 3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3, 3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammono)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio) ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VI NAL); (14) N-carboxyvinyl-α-alanine; (15) or combinations thereof.

69. The method or embedded hydrogel contact lens of any one of embodiments 54 to 67, wherein said at least one hydrophilic vinylic monomer comprises N-vinylpyrrolidone, N-vinyl-N-methyl acetamide, or combinations thereof.

70. The method or embedded silicone hydrogel contact lens of any one of embodiments 54 to 69, wherein said at least one hydrophilic vinylic monomer comprises N,N-dimethyl (meth)acrylamide.

71. The method or embedded hydrogel contact lens of any one of embodiments 54 to 70, wherein said at least one hydrophilic vinylic monomer comprises N-2-hydroxyethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

72. The method or embedded hydrogel contact lens of any one of embodiments 54 to 71, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

73. The method or embedded hydrogel contact lens of any one of embodiments 54 to 71, wherein the silicone hydrogel material comprises repeating units of at least one silicone-containing vinylic monomer of formula (M1) or (M2)

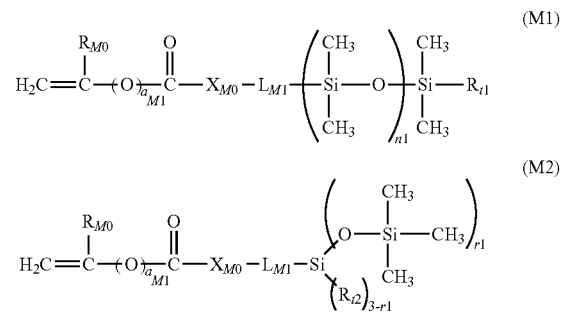

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $$—L_{M1}'—X_{M1}—L_{M1}''—, \quad —(C_2H_4O)_{\overline{v1}}CONH—L_{M1}''—,$$

$$—(C_2H_4O)_{\overline{v1}}L_{M1}''—, \quad —L_{M1}'—NHCOO—(C_2H_4O)_{\overline{v1}}L_{M1}''—,$$

$$—CH_2—CH(OH)—CH_2—X_{M1}'—(C_2H_4O)_{\overline{v2}}L_{M1}''—,$$

$$—L_{M1}'—X_{M1}'—CH_2—CH(OH)—CH_2—O—L_{M1}''—, \text{ or}$$

$$—(C_2H_4O)_{\overline{v1}}CH_2—CH(OH)—CH_2—O—L_{M1}''—;$$

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

74. The method or embedded hydrogel contact lens of any one of embodiments 54 to 71, wherein the silicone hydrogel material comprises tris(trimethylsilyloxy)silylpropyl (meth)acrylate, [3-(meth)acryloxy-2-hydroxypropyloxy]propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)-propyl] (meth)acrylamide, N,N-bis[2-hydroxy-3-(3-(tris(trimethylsilyloxy)silyl)propyloxy)-propyl]-2-methyl (meth)acrylamide, N,N-bis[2-hydroxy-3-(3-(tris(trimethylsilyloxy)silyl)-propyloxy)propyl] (meth)acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl)propyloxy)-propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-O-(methyl-bis-trimethylsiloxy-3-propyl)silylcarbamate, 3-(trimethylsilyl)propylvinyl carbonate, 3-(vinyloxycarbonylthio)-propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

75. The method or embedded hydrogel contact lens of any one of embodiments 54 to 74, wherein the silicone hydrogel material comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxy-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated w-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropy]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxypropyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy) dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

76. The method or embedded hydrogel contact lens of any one of embodiments 54 to 75, wherein the silicone hydrogel material comprises repeating units of at least one second polysiloxane vinylic crosslinker.

77. The method or embedded hydrogel contact lens of embodiment 76, wherein said at least one second polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha, omega-bis-3-aminopropyl-polydimethylsiloxane, or a combination thereof.

78. The method or embedded hydrogel contact lens of embodiment 76, wherein said at least one second polysiloxane vinylic crosslinker comprises: (1) a vinylic crosslinker which comprises one sole polydiorganosiloxane segment and two terminal ethylenically-unsaturated groups selected from the group consisting of (meth)acryloyloxy groups, (meth)acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

79. The method or embedded hydrogel contact lens of embodiment 76, wherein said at least one second polysiloxane vinylic crosslinker comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

80. The method or embedded hydrogel contact lens of any one of embodiments 54 to 79, wherein the silicone hydrogel material comprises repeating units of at least one non-silicone vinylic cross-linking agent.

81. The method or embedded hydrogel contact lens of embodiment 80, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N, N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane tri methacrylate, pentaerythritol tetramethacrylate, bisphenol A dimethacrylate, allylmethacrylate, allylacrylate, N-allyl-methacrylamide, N-allyl-acrylamide, or combinations thereof.

82. The method or embedded hydrogel contact lens of any one of embodiments 54 to 81, wherein the silicone hydrogel material comprises repeating units of at least one blending vinylic monomer.

83. The method or embedded hydrogel contact lens of embodiment 82, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

84. The method or embedded hydrogel contact lens of any one of embodiments 54 to 83, wherein the silicone hydrogel material comprises repeating units of at least one polymerizable material selected from the group consisting of a UV-absorbing vinylic monomer, a UV/HEVL-absorbing vinylic monomer, a photochromic vinylic monomer, a polymerizable dye, and combinations thereof.

85. The method or embedded hydrogel contact lens of any one of embodiments 54 to 84, wherein the silicone hydrogel material comprises at least about 5% by weight of the first polysiloxane vinylic crosslinker.

86. The method or embedded hydrogel contact lens of any one of embodiments 54 to 84, wherein the silicone hydrogel material comprises at least about 10% by weight of the first polysiloxane vinylic crosslinker.

87. The method or embedded hydrogel contact lens of any one of embodiments 54 to 84, wherein the silicone hydrogel material comprises at least about 15% by weight of the first polysiloxane vinylic crosslinker.

88. The method or embedded hydrogel contact lens of any one of embodiments 54 to 84, wherein the silicone hydrogel material comprises at least about 20% by weight of the first polysiloxane vinylic crosslinker.

89. The method or embedded hydrogel contact lens of any one of embodiments 54 to 84, wherein the silicone hydrogel material comprises at least about 25% by weight of the first polysiloxane vinylic crosslinker.

90. The method or embedded hydrogel contact lens of any one of embodiments 54 to 89, wherein the silicone hydrogel material has an equilibrium water content (i.e., in fully hydrated state or when being fully hydrated) of from about 20% to about 70% by weight, an oxygen permeability of at least about 40 barrers, and a modulus (i.e., Young's modulus) of about 1.5 MPa or less.

91. The method or embedded hydrogel contact lens of any one of embodiments 54 to 89, wherein the silicone hydrogel material has an equilibrium water content (i.e., in fully hydrated state or when being fully hydrated) of from about 20% to about 65% by weigh.

92. The method or embedded hydrogel contact lens of any one of embodiments 54 to 89, wherein the silicone hydrogel material has an equilibrium water content (i.e., in fully hydrated state or when being fully hydrated) of from about 25% to about 65% by weigh.

93. The method or embedded hydrogel contact lens of any one of embodiments 54 to 89, wherein the silicone hydrogel material has an equilibrium water content (i.e., in fully hydrated state or when being fully hydrated) of from about 30% to about 60% by weigh.

94. The method or embedded hydrogel contact lens of any one of embodiments 54 to 93, wherein the silicone hydrogel material has an oxygen permeability of at least about 60 barrers.

95. The method or embedded hydrogel contact lens of any one of embodiments 54 to 93, wherein the silicone hydrogel material has an oxygen permeability of at least about 80 barrers.

96. The method or embedded hydrogel contact lens of any one of embodiments 54 to 93, wherein the silicone hydrogel material has an oxygen permeability of at least about 100 barrers.

97. The method or embedded hydrogel contact lens of any one of embodiments 54 to 96, wherein the silicone hydrogel material has a modulus (i.e., Young's modulus) of from about 0.2 MPa to about 1.2 MPa.

98. The method or embedded hydrogel contact lens of any one of embodiments 54 to 96, wherein the silicone hydrogel material has a modulus (i.e., Young's modulus) of from about 0.3 MPa to about 1.1 MPa.

99. The method or embedded hydrogel contact lens of any one of embodiments 54 to 96, wherein the silicone hydrogel material has a modulus (i.e., Young's modulus) of from about 0.4 MPa to about 1.0 MPa.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of an insert and an insert material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Refractive Index

The refractive index (RI) of inserts is determined by Abbe tranmission laboratory refractometer Reichert Abbe Mark III at 25° C. The inserts are fully equilibrated in PBS saline solution before measurement.

Elastic Modulus

The storage modulus (Young's modulus) of inserts is determined using a TA RSA-G2 DMA (Dynamic Mechanical Analyzer). The insert is cut into a 3.08 mm wide strip using Precision Concept dry lens cutter. Five thickness values are measured within 6.5 mm gauge length. The strip is mounted on the instrument with metal grips. Oscillation temperature ramp test with a linear ramping rate at 2° C./minute from 10° C.~50° C. is applied on the insert, the material response to increasing temperature is monitored at a constant frequency of 1 Hz, constant amplitude of 0.5% deformation and sampling rate of 10.0 pts/s. Storage modulus (E'), loss modulus (E") and tan δ data are calculated by TRIOS software.

The elastic modulus of a silicone hydrogel material or contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed is applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Glass Transition Temperature

Glass transition temperature (Tg) of the insert is defined as the peak of tan δ from the dynamic temperature ramp test as described above.

Delamination

Embedded hydrogel contact lenses are examined for possible delamination either using Optimec instrument or Optical Coherence Tomography (OCT).

Regardless of evaluation method, contact lenses are staged for a minimum of 12 hours at room temperature after autoclave run and prior to delamination study.

After meeting required staging time, fully hydrated contact lens is placed in a "V" graticule assembly of Optimec instrument (Model JCF; OPTIMEC England). After the contact lens is settled under the influence of gravity, the front view of the contact lens is inspected carefully for any sign of circular pattern. Delamination displays as circular patterns in Optimec image.

OCT (Spectral Domain Optical Coherence Tomography; Telesto-II; Thorlabs) could also be utilized to study delamination. OCT allows non-invasive imaging of the contact lens to obtain high resolution cross-section image. For this purpose, after meeting the minimum staging requirement, the contact lens is removed from its blister and is soaked into PBS solution for a minimum of 30 min to come to equilibrium. Then a cuvette with a "V" block feature will be filled approximately ¾ with fresh PBS solution and the contact lens will be transferred to the cuvette using Q-tips. The lens will be allowed to freely float to the "V" shape at the bottom of the cuvette and the entire contact lens will be scanned in increment of 10 degree. Delamination appears as air pocket in interval surface of insert and carrier in OCT images.

Chemicals

The following abbreviations are used in the following examples: PETA represents pentaerythritol tetraacrylate; TrisMA represents 3-[Tris(trimethylsiloxy)silyl]propyl methacrylate; HFIPMA represents hexafluoroisopropyl methacrylate; NPGDMA represents neopentyl glycol dimethacrylate; DMA represents N,N-dimethyl acrylamide; HEMA represent 2-hydroxyethyl methacrylate; TEGDMA represent triethyleneglycol dimethacrylate; VAZO-52 represent 2-2'-Azobis(2,4-dimethylvaleronitrile); VAZO 67 represents 2,2'-azobis(2-methylbutyronitrile); RB247 is Reactive Blue 247; EGBE represents ethylene glycol butyl ether; PBS represents a phosphate-buffered saline which has a pH of 7.2±0.2 at 25° C. and contains about 0.044 wt. % $NaH_2PO_4·H_2O$, about 0.388 wt. % $Na_2HPO_4·2H_2O$, and about 0.79 wt. % NaCl and; wt. % represents weight percent; Betacon represents a dimethacrylate-terminated chain-extended polydimethylsiloxane (Mn ~5000 g/mol), which has two polydimethylsiloxane (PDMS) segments separated by one perfluoropolyether (PFPE) via diurethane linkages between PDMS and PFPE segments and two urethane linkages each located between one terminal methacrylate group and one PDMS segment, is prepared according to method similar to what described in Example B-1 of U.S. Pat. No. 5,760,100 (herein incorporated by reference in its entirety); PrOH represents 1-propanol; "$H_4$" macromer represents a di-methacryloyloxypropyl-terminated polysiloxane (Mn ~11.3K-12.3K g/mol, OH content ~1.82-2.01 meq/g) of formula (A) shown below.

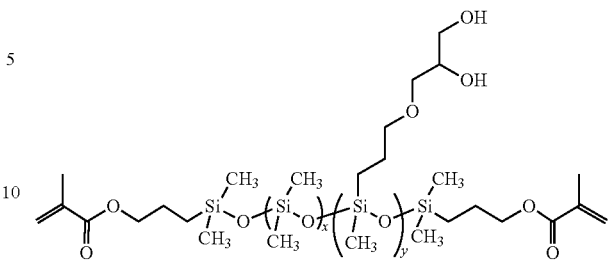

(A)

Example 2

Insert-Forming Compositions

A base insert-forming compositions (i.e., Insert formulations) for making rigid hydrophobic inserts are prepared at room temperature in air by blending all the components (materials) as following: 45 weight part units of HFIPMA; 21 weight part units of NPGDMA; 45 weight part units of TrisMA; 0.5 weight part units of PETA; 3 weight part units of RB247; and 0.5 weight part units of Vazo-67. Three magnetized insert-forming compositions are then prepared by adding 1%, 0.1% and 0.02% by weight of magnetite (Sensient Cosmetics, black iron oxide, 2-5 μm). The black iron (II, III) oxide may also be incorporated by first forming a suspension in TRIS-MA or other monofunctional monomer that is part of the insert formulation. The suspension is typically 5-50% black iron oxide (w/w) and is formed by ball milling methods.

Lens-Forming Compositions

A lens-forming composition (i.e., SiHy lens formulation) is prepared at room temperature in air by blending all the components (materials) as following: 33 weight part units of H4; 17 weight part units of TrisMA; 24 weight part units of DMA; 1 weight part units of TEGDMA; 25.5 weight part units of EGBE; and 0.5 weight part units of Vazo-67.

Preparation of Embedded Silicone Hydrogel Contact Lenses

An insert-forming composition prepared above is purged with nitrogen at room temperature for 30 to 35 minutes. An amount of the $N_2$-purged insert-forming composition is disposed in the center of the molding surface of a female mold half that is made of polypropylene. The female lens mold half with the insert-forming composition therein is closed with a male mold half which is made of polypropylene. The oven is configured as follows: a nitrogen supply is connected to the oven through a higher flow capacity controller which can control the flow rate of nitrogen through the oven; at the exhaust line of the oven, vacuum pumps are connected to control the differential pressure of the oven.

The insert-forming compositions in the molds are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7°

C./minute; and holding at 100° C. for about 30-40 minutes. The molds are opened and the molded inserts are removed from the insert-adhered mold halves.

As control, non-magnetized inserts are obtained from the base insert-formulation (free of any magnetite).

A magnetized insert or a non-magnetized insert prepared above is placed in the central region of the molding surface of a female mold half (made of polypropylene), an amount of a SiHy lens formulation prepared above is dosed in the female mold half to immerse the magnetized insert, a polypropylene male mold half is then placed on top the female mold half, and the mold is closed securely. A magnet (rare earth, SmCo, applied field 50-2000 Gauss) is placed below the female mold half to center the magnetized insert and hold it in position in the closed mold.

The closed mold with a magnetized insert immersed in a SiHy lens formulation therein are thermally cured in the oven under the following conditions: ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes. The molds are opened and the molded unprocessed embedded hydrogel contact lenses are removed from the molds.

Lens molds each with a molded unprocessed silicone hydrogel contact lens therein are mechanically opened. The molded unprocessed embedded silicone hydrogel contact lens adhere to the male mold halves or female mold halves. Molded unprocessed embedded silicone hydrogel contact lenses adhered to male mold halves are delensed using ultrasonic unit; molded unprocessed embedded silicone hydrogel contact lenses adhered to female mold halves are delensed are manually from lens-adhered female mold halves.

The delensed unprocessed embedded silicone hydrogel contact lenses can be extracted with a mixture of 50:50 of propylene glycol:water. Preferably, the delensed unprocessed embedded silicone hydrogel contact lenses are subjected to the following extraction/hydration, coating, autoclave processes as follows. The unprocessed embedded silicone hydrogel contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of a in-package-coating packaging saline which is prepared according to the procedure described in Example 19 of U.S. Pat. No. 8,480,227; and finally autoclaved for about 45 minutes at 121° C. The resultant embedded SiHy contact lenses each have a hydrogel coating thereon.

FIG. 1 shows images of the unprocessed embedded SiHy contact lens obtained before opening the mold. FIG. 1A shows that the magnetized insert (from a magnetized insert-forming composition including 1% by weight of magnetites) is centered by the magnet in the unprocessed embedded silicone hydrogel contact lens. FIG. 1B shows that the non-magnetized insert cannot be centered by the magnet as shown by the decentered insert.

The obtained embedded SiHy contact lenses are examined for delamination according to the procedures described in Example 1. No bubble is observed under microscopy at interfaces between the magnetized insert and the SiHy bulk material within the embedded silicone hydrogel contact lens, i.e., no delamination.

Example 3

This example illustrates that a magnetized insert A can be formed by printing a magnetic colored image (e.g., an annular ring around the edge of the insert) onto at least one of the front and back surfaces of an annular ring of magnetite around the edge of the insert. This provides enough magnetic material to allow an external magnet to control the position of the magnetized insert during casting-molding of embedded SiHy contact lenses.

Preparation of Siloxane-Containinci Binder Polymer ("Binder Polymer")

The binder polymer is a silicone hydrogel copolymer and prepared according to a 2-step process as described in Example 2 of U.S. Pat. Appl. Pub. No. 2017-0183520A1. In the first step, a reactive mixture of DMA (38.53 weight unit parts), TRISMA (24.49 weight unit parts), HEMA (10.10 weight unit parts), Betacon (21.47 weight unit parts), VAZO-52 (weight unit parts), and 2-mercaptoethanol (1.38 weight unit parts) in ethyl acetate (158 weight unit parts) as solvent are copolymerized. The copolymerization reaction is carried out under nitrogen in ethyl acetate at 50° C. for about 24 hours. In this process, VAZO-52 is used to initiate the polymerization while 2-mercaptoethanol is used as a chain transfer agent. The 2-mercaptoethanol chain transfer agent regulates molecular weight and prevents gelation during the polymerization process.

In the second step, isocyanatoethyl methacrylate (IEM) (3.43 weight unit parts) and dibutyltin dilaurate (DBTDL) (0.08 Weight unit parts) are added to ethylenically functionalize the copolymer produced above to render it actinically-crosslinkable. The DBTDL catalyzes the reaction of the isocyanate groups of IEM with the hydroxy groups of HEMA units in the copolymer produced in step 1. Once the reaction of IEM is complete, the ethyl acetate is exchanged with PrOH and the binder solution is then concentrated to a solid content of 65-70% by weight.

Ink Formulation

An ink containing magnetite ($Fe_3O_4$, Sensient Cosmetics, as described above, 2-5 μm particle size) is prepared to have a composition: 10% by weight of Black iron oxide (50%, dispersed in 1-propanol); 38% by weight of the binder solution prepared above; 1% by weight of Omnirad 754 (formerly Irgacure 754, 2-[2-(2-oxo-2-phenylacetyl)oxyethoxy]ethyl 2-oxo-2-phenylacetate) and 51% by weight of PrOH. It is understood that any photoinitiator may be used, preferably Omnirad 1173, more preferably Omnirad 2959).

The formulation is loaded into an ink cup mated to a stainless steel cliché plate with a ring pattern with outer diameter of 12.96 mm and an inner diameter of 4.95 mm:

Preparation of Magnetized Inserts

Inserts (having a diameter of about 6-7 mm) are cast-molded from the base insert-forming composition (prepared in Example 2) according to the procedure described in Example 2. A magnetic annular ring is printed onto the front surface of an insert with the ink (prepared above and having magnetic particles therein) around the edge of the insert by using a pad printing system similar to that described in FIG. 2 of U.S. Pat. Appl. Pub. No. 2020/0376787 A1. The number of prints on the insert varied from 1-20 to increase the amount of magnetic particles. The print(s) is (are) cured using the UV Fusion lamp system at a belt speed of 20 feet per minute using the H-bulb (Heraeus Noblelight) to obtain magnetized inserts each having a magnetic annular ring thereon.

Preparation of Embedded Silicone Hydrogel Contact Lenses

Embedded silicone hydrogel contact lenses are prepared from the magnetized inserts prepared above and the silicone hydrogel lens formulation prepared in Example 2 according to the procedure described in Example 2.

It is observed that the magnetized insert (with a magnetic annular ring printed thereon) can be centered in the embedded silicone hydrogel contact lens. When examining the obtained embedded SiHy contact lenses for delamination according to the procedures described in Example 1, no bubble is observed under microscopy at interfaces between the magnetized insert and the SiHy bulk material within the embedded silicone hydrogel contact lens, i.e., no delamination.

All the publications, patents, and patent application publications, which have been cited herein above in this application, are hereby incorporated by reference in their entireties.

What is claimed is:

1. A method for producing embedded hydrogel contact lenses, comprising the steps of:
   (1) obtaining a magnetized insert which comprises a front surface, an opposite back surface and a diameter up to about 13.0 mm, wherein the insert is made of a polymeric material and comprises magnetic particles;
   (2) obtaining a lens mold, wherein the lens mold comprises a female mold half having a first molding surface and a male mold half having a second molding surface, wherein the female and male mold halves are configured to receive each other such that a mold cavity is formed between the first and second molding surfaces when the mold is closed;
   (3) in no particular order, placing the magnetized insert in the lens mold and introducing a lens-forming composition in the lens mold, wherein the magnetized insert is immersed in the lens-forming composition in the lens mold and centered and held in position in the lens mold by using a magnet which is place below the lens mold;
   (4) curing the lens-forming composition in the lens mold while holding the magnetized insert centered in the lens mold by the magnet to form an unprocessed embedded hydrogel contact lens that comprise a bulk hydrogel material formed from the lens-forming composition and the magnetized insert embedded in the bulk hydrogel material and centered in the unprocessed embedded hydrogel contact lens;
   (5) separating the lens mold obtained in step (4) into the male and female mold halves, with the unprocessed embedded hydrogel contact lens adhered on a lens-adhered mold half which is one of the male and female mold halves;
   (6) removing the unprocessed embedded hydrogel contact lens from the lens-adhered mold half (preferably before the unprocessed embedded hydrogel contact lens is contact with water or any liquid); and
   (7) subjecting the unprocessed embedded hydrogel contact lens to post-molding processes including a hydration process and one or more other processes selected from the group consisting of extraction, surface treatment, packaging, sterilization, and combinations thereof.

2. The method of claim 1, wherein the step of (4) curing the lens-forming composition is carried out actinically by using UV and/or visible light.

3. The method of claim 1, wherein the step of (4) curing the lens-forming composition is carried out thermally by heating the first molding assembly in an oven at one or more curing temperatures selected from about 40° C. to about 100° C.

4. The method of claim 1, wherein the magnetized insert comprises the magnetic particles which are distributed in the polymeric material of the magnetized insert.

5. The method of claim 1, wherein the magnetized insert comprises a magnetic coating on one of the front and back surfaces, wherein the magnetic coating comprises the magnetic particles.

6. The method of claim 1, wherein the magnetized insert comprises a magnetic color image printed on one of the front and back surfaces with at least one ink comprising magnetic particles, wherein the magnetic color image is comprises the magnetic particles.

7. The method of claim 6, wherein the magnetic color image comprises an annular ring.

8. The method of claim 1, wherein the polymeric material of the magnetized insert comprises repeating units of at least one polymerizable photochromic compound (i.e., photochromic vinylic monomer), at least one UV-absorbing vinylic monomer, at least one UV/HEVL-absorbing vinylic monomer, at least one fluorescent vinylic monomer, or combinations thereof.

9. The method of claim 1, wherein the magnetized insert comprises at least one color-filtering material for correcting color blindness, a diffractive material, a high refractive-index material, or combinations.

10. The method of claim 1, wherein the polymeric material of the magnetized insert is a hard plastic material.

11. The method of claim 1, wherein the polymeric material of the magnetized insert is a crosslinked silicone polymer that has three-dimensional polymer networks, is insoluble in water, and has an equilibrium water content of about 5% or less by weight.

12. The method of claim 1, wherein the polymeric material of the magnetized insert is a rigid gas permeable material.

13. The method of claim 1, wherein the polymeric material of the magnetized insert is a hydrophobic crosslinked acrylic material that has an equilibrium water content of less than 5% by weight and comprises at least 55% by mole of repeating units of one or more acrylic monomers and/or one or more acrylic crosslinker and at least about 6% by mole of repeating units of at least one vinylic crosslinking agent.

14. The method of claim 13, wherein the hydrophobic insert is rigid.

15. The method of claim 1, wherein the bulk hydrogel material is a non-silicone hydrogel material comprising at least 50% by mole of repeating units of at least one hydroxyl-containing vinylic monomer.

16. The method of claim 15, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl) methyl (meth)acrylamide, vinyl alcohol, allyl alcohol, and combinations thereof.

17. The method of claim 1, wherein the bulk hydrogel material is a silicone hydrogel material.

18. The method of claim 17, wherein the bulk hydrogel material comprises (a) repeating units of at least one first polysiloxane vinylic crosslinker comprising hydrophilized siloxane units each having one methyl substituent and one organic radical including at least one H-bond donor and (b) repeating units of at least one hydrophilic vinylic monomer, wherein the content of said at least one H-bond donor is at least about 0.8 meq/g relative to the molecular weight of said at least one first polysiloxane vinylic crosslinker.

19. An embedded hydrogel contact lens, comprising:
an anterior surface, an opposite posterior surface, a bulk hydrogel material, and a magnetized insert embedded in the bulk hydrogel material,
wherein the magnetized insert is made of a polymeric material and comprises magnetic particles, wherein the magnetized insert has a front surface, an opposite back surface and a diameter up to about 13.0 mm, wherein the magnetized insert is located in a central portion of the embedded hydrogel contact lens, wherein the embedded hydrogel contact lens is not susceptible to delamination as demonstrated by being free of bubble that can be observed under microscopy at interfaces between the insert and the bulk material within the embedded silicone hydrogel contact lens after being autoclaved in a packaging solution in a sealed package, wherein the packaging solution is a buffered saline having a pH of 7.1±0.2.

* * * * *